United States Patent [19]

Glenn

[11] Patent Number: 4,800,426

[45] Date of Patent: Jan. 24, 1989

[54] METHOD AND SYSTEM FOR TRANSMISSION AND RECEPTION OF HIGH DEFINITION

[75] Inventor: William E. Glenn, Ft. Lauderdale, Fla.

[73] Assignee: New York Institute of Technology, Old Westbury, N.Y.

[21] Appl. No.: 51,505

[22] Filed: May 18, 1987

[51] Int. Cl.[4] .................. H04N 7/04; H04N 7/087; H04N 5/50

[52] U.S. Cl. .................... 358/141; 358/12; 358/171.1; 358/147

[58] Field of Search .................. 358/12, 13, 141, 142, 358/147, 191.1, 193.1

[56] References Cited

U.S. PATENT DOCUMENTS

| | | | |
|---|---|---|---|
| 3,493,674 | 2/1970 | Houghton | 358/147 |
| 4,292,650 | 9/1981 | Hendrickson | 358/123 |
| 4,323,922 | 4/1982 | den Toonder et al. | 358/117 |
| 4,517,597 | 5/1985 | Glenn | 358/141 |
| 4,518,993 | 5/1985 | Okada et al. | 358/86 |
| 4,535,352 | 8/1985 | Haskell | 358/16 |
| 4,567,508 | 1/1986 | Hulyer | 358/11 |
| 4,567,531 | 1/1986 | Tabata | 358/335 |
| 4,581,640 | 4/1986 | Cole | 358/141 |
| 4,628,344 | 12/1986 | Glenn | 358/12 |
| 4,652,909 | 3/1987 | Glenn | 358/41 |
| 4,682,234 | 7/1987 | Naimpally | 358/183 |

OTHER PUBLICATIONS

W. E. Glenn, "HDTV Compatible Transmission System", National Association of Broadcasters, Apr., 1986.
W. E. Glenn, "Compatible Terrestrial HDTV Transmission" National Association of Broadcasters, Apr., 1986.

Primary Examiner—James J. Groody
Assistant Examiner—Michael D. Parker
Attorney, Agent, or Firm—Martin M. Novack

[57] ABSTRACT

A system and method are disclosed for transmission and reception of high definition television signals. A standard television signal is transmitted over a first transmission frequency channel, and an enhancement signal, to be used for enhancing the standard signal to obtain a high definition signal, is transmitted over a second transmission frequency channel that is non-adjacent to the first transmission frequency channel. A code signal, which identifies the second transmission frequency channel, is combined into the standard television signal before transmission. The code signal is recovered at the receiver, and used to automatically tune the receiver to also receive the enhancement signal sent over the second transmission frequency channel. A second code signal, representative of other information, such as the portion of the second transmission frequency channel that contains the enhancement information, can also be sent with the standard signal.

18 Claims, 2 Drawing Sheets

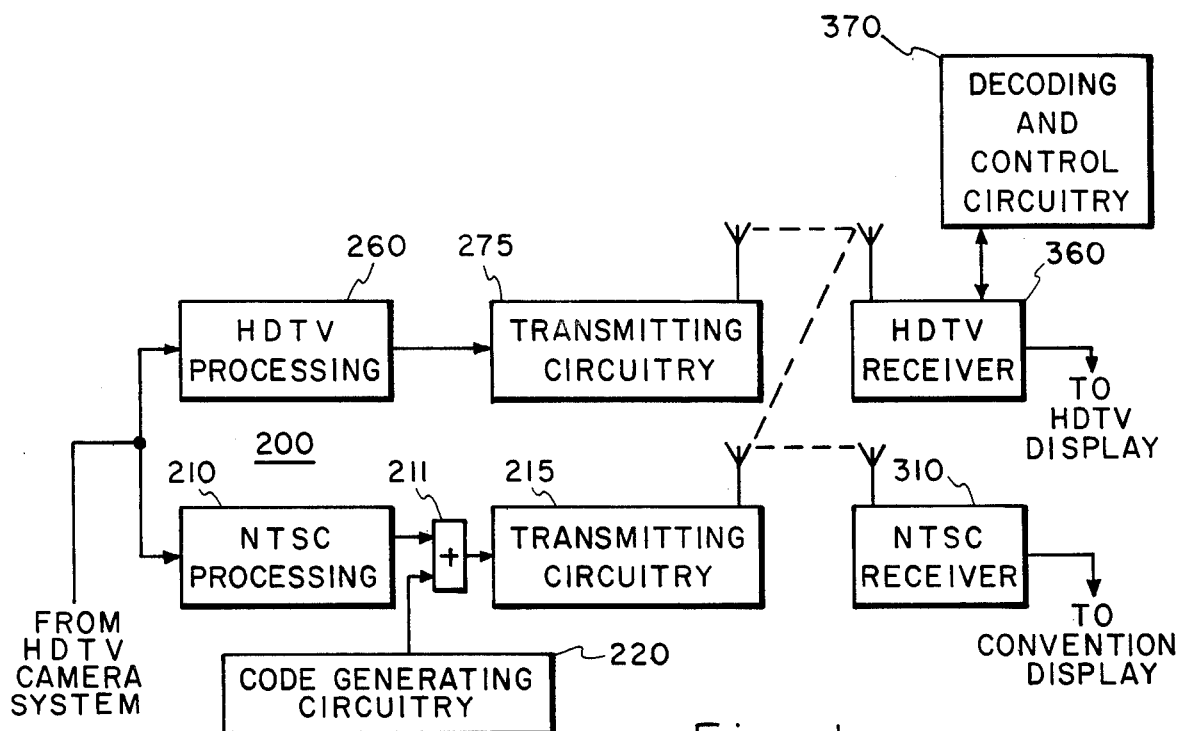
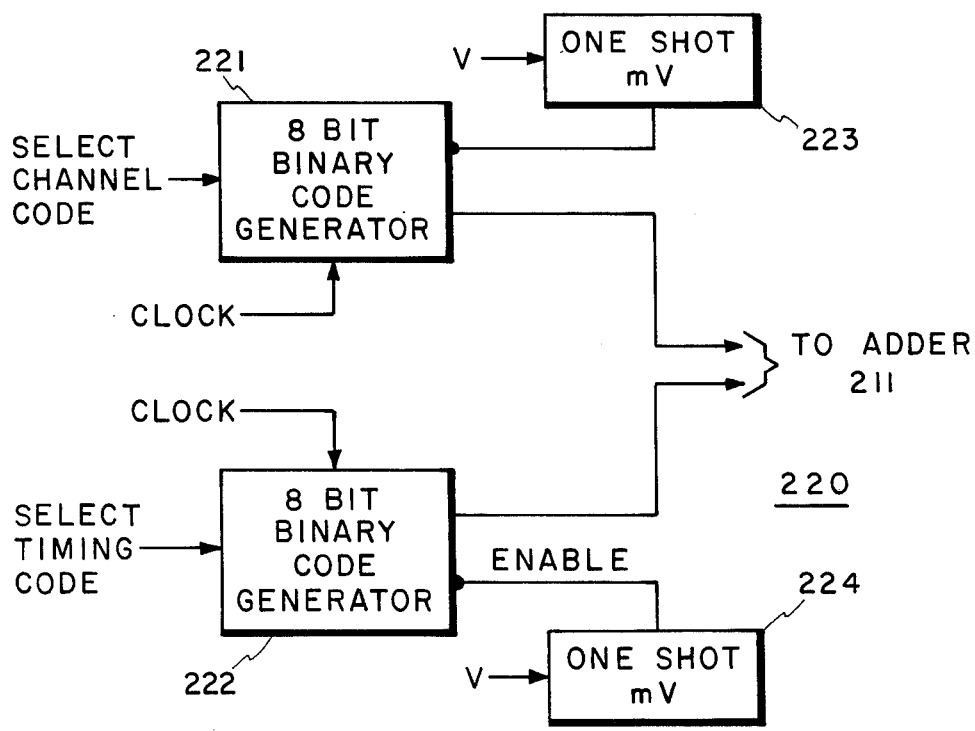
Fig. 1
Fig. 2

METHOD AND SYSTEM FOR TRANSMISSION AND RECEPTION OF HIGH DEFINITION

BACKGROUND OF THE INVENTION

This invention relates to television transmission and reception and, more particularly, to a method and system for transmission and reception of high definition television information.

As high definition television (HDTV) becomes more prevalent, improved systems are needed for transmission and reception of the additional information required for presenting HDTV images. A number of HDTV schemes have been proposed. In my U.S. Pat. Nos. 4,517,597, 4,628,344, and 4,652,909, and my U.S. patent application Ser. No. 005,296, as well as in my publication "HDTV Compatible Transmission System", National Association of Broadcasters, April, 1986, there is disclosed an HDTV system that utilizes a "two signal" approach which permits compatible transmission of HDTV. For operation in NTSC, one signal would carry the standard 525 line NTSC transmission, and a second signal would carry detail signals that can be received by receivers having HDTV capability and suitably combined with the standard signals to obtain HDTV signals for display. As described in my referenced patents, application, and publication, the detail signal can be sent at a reduced frame refresh rate, thereby saving substantial bandwidth. Nonetheless, at least a portion of an additional TV transmission channel is needed for transmission of the detail signal. In other proposed systems, the enhancement signal may take forms other than the type of detail signal described in my above referenced patents and application but, again, at least a portion of an additional television transmission channel will be needed for transmission of the enhancement signal.

If an expaned channel or an adjacent channel is available for transmission, the enhancement signal can be sent thereon. However, for various reasons, such as channel availability, it may sometimes be desirable to send the enhancement signal over a channel that is not adjacent to the channel being used to send the standard or main portion of the HDTV signal.

Representative prior art patents, which deal with topics including transmission of HDTV signals, the transmission of coded information with television information, transmission of auxiliary information with television signals, and addressing of television receivers, are set forth in U.S. Pat. Nos. 3,493,674, 4,292,650, 4,535,352, 4,323,922, 4,567,508, 4,567,531 and 4,581,640.

It is among the objects of the present invention to provide improvements in systems and methods for transmission of HDTV signals, particularly where enhancement signals are transmitted over a channel that is not adjacent to the channel carrying the standard or main portion of the HDTV signal.

SUMMARY OF THE INVENTION

The present invention is directed to a system and method for transmission and reception of high definition television signals. In accordance with an embodiment of the method of the invention, a first television signal and a second television signal are derived from images of a scene to be transmitted. The second television signal contains an enhancement signal which, when combined with the first television signal, can produce a high definition television signal representative of said images. A code signal is generated, the code signal being representative of a transmission frequency channel over which the second television signal is to be transmitted. The code signal is combined with the first television signal. The first television signal is transmitted over a first transmission frequency channel, and the second television signal is transmitted over a second transmission frequency channel.

The first television signal is received at a receiver, typically via a first tuner, and the code signal is recovered therefrom. A further tuner is provided, and the code signal is utilized to control the further tuner to selectively receive the second television signal over the second transmission frequency channel. A high definition television signal, representative of said images, is then produced from a combination of the received first and second television signals. The high definition television signal can typically be displayed and/or recorded for subsequent display. Thus, in accordance with the invention, when a non-adjacent transmission frequency channel is utilized for transmission of high definition television enhancement signals, a code signal sent with the television signal on the main channel can be utilized to automatically tune receivers having a high definition television capability to the appropriate channel for reception of the enhancement signal.

In accordance with an embodiment of the invention, a second code signal is generated and also combined into the first television signal for transmission. The second code signal is representative of a characteristic of the second television signal. For example, the second code signal may convey timing information concerning the second television signal. This timing information may be utilized to synchronize operation as between the first television signal and the portion of the second television signal that is to be used for enhancing the first television signal. This embodiment also has application when the second transmission frequency channel is shared between the enhancement signal for the first television signal, and other information, such as an enhancement signal for another main channel signal. In this embodiment, the second code signal is recovered at the receiver, and utilized in obtaining and/or processing the second television signal that is received over the second transmission frequency channel.

Further features and advantages of the invention will become more readily apparent from the following detailed description when taken in conjunction with the accompanying drawings.

BRIEF DESCRIPTION OF THE DRAWINGS

FIG. 1 is a block diagram of a high definition television transmission and reception system in accordance with an embodiment of the invention, and which can be used to practice the method of the invention.

FIG. 2 is a block diagram of an embodiment of circuitry for generating code signals at the transmitter.

DESCRIPTION OF THE PREFERRED EMBODIMENT

Figure 3:
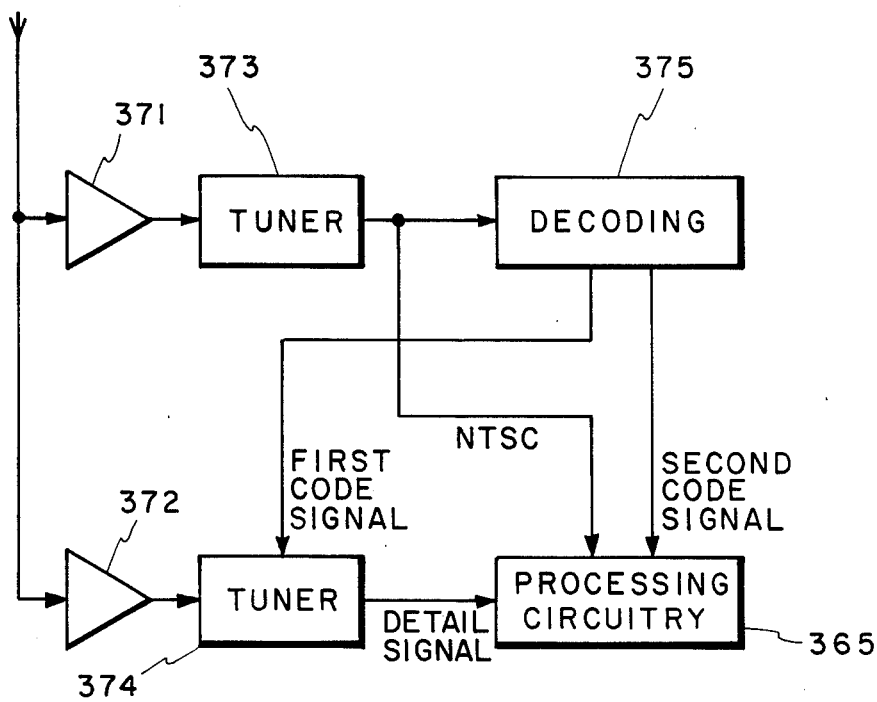
FIG. 3 is a block diagram of a portion of the receiver circuitry in accordance with an embodiment of the invention.

Referring to FIG. 1, there is shown a compatible high definition television transmission and receiving system of the general type described in my above-referenced publication "HDTV Compatible Transmission System", but which includes improvements in accordance with the present invention. A transmitter 200 includes NTSC processing circuitry 210 which processes television signals from a source such as a television camera system (not shown) or a video recording system (not shown). The circuitry 210 is coupled to transmitting circuitry 215, which typically includes modulation circuitry and other suitable circuitry for producing a transmitted signal which, in the present embodiment, is substantially a standard NTSC television signal, and is transmitted over a standard NTSC channel. The television signals from the television camera system or video recorder (which is assumed to have a high definition video capability) are also processed by high definition television (HDTV) processing circuitry 260 which produces detail signals that can be utilized to enhance conventional television signals to obtain HDTV signals, as described in my abovereferenced patents, application, and publication. The detail signals are coupled to further circuitry 275, which transmits the detail signal over a second (auxiliary) channel that is not adjacent to the (main) NTSC channel used for transmission of the standard portion of the television information. As I have previously described in the above-noted references, the detail information of my system requires less than a full standard channel, so it can share a standard channel with another signal (e.g. the detail signal to be used for enhancing a different main channel). However, certain features of the invention would apply to a system wherein the enhancement information is sent by itself on an auxiliary channel.

The NTSC signal is received by receivers such as receiver 310 which has only a capability of producing a television picture at substantially conventional resolution. Receivers such as receiver 360, which have a capability for receiving, processing, and displaying high definition television signals, receive both the main channel carrying the NTSC signal and the auxiliary channel carrying the detail signals to be used for enhancement of the NTSC video signal so as to produce a high definition television signal for display on an HDTV display (not shown). The present invention is not directed, per se, to any particular processing technique for combining a detail signal with a conventional resolution television signal to obtain a high definition television signal. In this regard, reference can be made, for example, to the abovereferenced U.S. patents, applications, and publication for a description of the type of processing that can be employed.

As described thus far, the system of the FIG. 1 embodiment is in accordance with the description set forth in my abovereferenced publication "HDTV Compatible Transmission System". In accordance with the improvements of the present invention, one or more code signals are combined with the main channel signal, and the code signals can be used at an HDTV receiver to automatically tune for obtainment of the auxiliary channel carrying the detail signal, and to aid in the proper extraction of the detail signal from the auxiliary channel.

In the embodiment of FIG. 1, code generating circuitry 220 generates one or more code signals that are combined into the NTSC signal output of circuitry 210 by adder 211. At the receiver end, the HDTV receiver 360 includes additional circuitry, represented in FIG. 1 by the block 370, for recovering the code signal(s) from the main channel signal and for utilizing the code signal(s) for automatically tuning to the appropriate auxiliary channel. Another code signal is also utilized, if necessary, to select the appropriate portion of the detail signal channel (for example, the appropriate fields for a field sequential multiplexing arrangement), that contains the desired detail information.

Referring to FIG. 2, there is shown a block diagram of the code generation circuitry 220 of the FIG. 1 embodiment. A pair of 8-bit binary code generators 221 and 222 are operative to receive operator-selected inputs that determine the binary code sequences that are to be generated by the circuits. Regarding code generator 221, this allows the operator to select from among $2^8$ (equals 256) possible channels, the selected (auxiliary) channel being the one that is being used to broadcast the detail signal for use in conjunction with the particular (main) NTSC channel to which the code will be added. The second code generator, 222, also receives an operator-selected input, this input being represented of further information concerning the detail signal channel, for example the selection of the frame, field or lines which contain desired information, or other appropriate coding information. It will be understood that, alternatively, a single code generating circuit could be employed with, for example, certain bits of a single code being used to designate the appropriate detail channel, and other bits thereof being used to designate the portion of the channel that contains the desired information. The coding circuits receive clock signals from the basic system clock utilized in generating the television signals, and also receive an enable signal which determines when the code sequence is initiated. The vertical synch signal, V, from the television timing circuitry is received by one-shot multivibrators 223 and 224 which have characteristic delay times that are selected in accordance with the particular time during the vertical blanking interval that the code signals should each occur. At these characteristic times, the coding circuits 221 and 222 are respectively enabled, and the selected binary code is clocked out as a pattern of "1's" and "0's". The code signals are added to the video signal via adder 211 (FIG. 1), so that the video signal output contains the desired codes in its vertical blanking interval.

Referring to FIG. 3, there is shown a block diagram of portions of high definition television receiver 360, as modified using circuitry in accordance with the invention, and represented in FIG. 1 by the block 370. The receiver has two tuners 373 and 374, each of which receives television signals, after suitable preamplification by preamplifiers 371 and 372, respectively. The tuner 373 is the main channel tuner, and is controlled by the viewer, in conventional manner, to be tuned to the desired television channel which, in the present example, is assumed to be channel for which a high definition enhancement signal is being sent on a non-adjacent auxiliary channel. The output of tuner 373 is coupled to decoding circuitry 375, which recovers the code signals, and also to processing circuitry 365. The tuner 374 is electronically controlled by the first code signal. The signal obtained by the tuner 374 (i.e., the detail signal on the auxiliary channel), is coupled to processing circuitry 365. The improvement of the present invention does not, per se, deal with the nature of this processing circuitry for combining, in appropriate fashion, the conventional resolution television signal with the high definition enhancement signal, to obtain a high definition television signal for display. In this regard, reference can again be made, for example, to my above-referenced patents, application, and publication. The processing circuitry 365 also receives the second code signal from the decoding circuitry, this signal indicating the portion of the auxiliary channel which contains the desired enhancement information, in those cases where the detail channel is shared between a plurality enhancement signals, and/or timing information associated with the enhancement signal.

Figure 4:
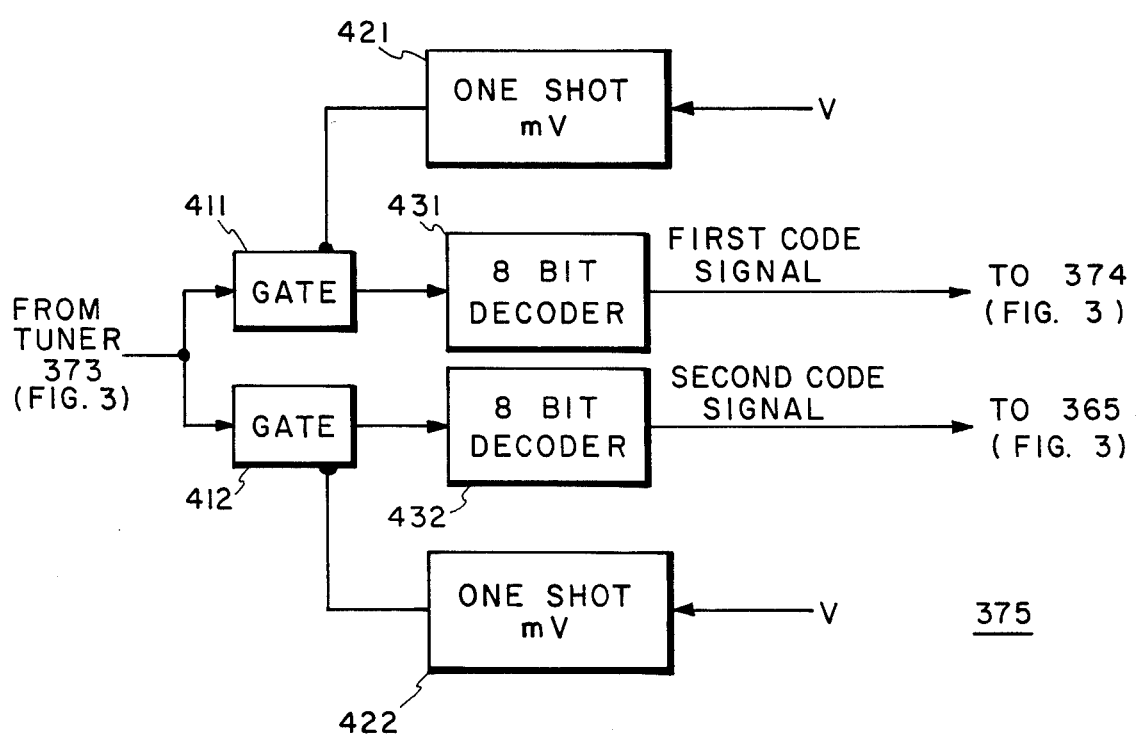
FIG. 4 is a block diagram of an embodiment of the decoding circuitry at the receiver.

Referring to FIG. 4, there is shown a block diagram of an embodiment of the decoder 375 of FIG. 4. A pair of gates 411 and 412 receive the television signal from tuner 373. The gates are enabled by the outputs of one-shot multivibrators 421 and 422, respectively. The one-shots are synchronized by the vertical synch signal V (from processing circuitry 365), and have the same characteristic times as their counterparts in FIG. 2, so that their outputs occur at the proper time to enable the respective gates to pass the respective code signals. Eight bit decoders 431 and 432, clocked by clock signals from processing circuitry 65, can be provided to convert the eight-bit codes, if necessary, into the form that is suitable for their respective control functions.

The invention has been described with reference to a particular preferred embodiment, but variations within the spirit and scope of the invention will occur to those skilled in the art. For example, the selection of channel codes and timing codes at the transmitter could be automatically implemented. Further, other known techniques for combining signals into the blanking portions of the main channel signal, and then recovering same, can be employed.

I claim:

1. A method for transmission and reception of high definition television signals, comprising the steps of:
   deriving, from images of a scene to be transmitted, a first television signal and a second television signal, said second television signal containing an enhancement signal which, when combined with said first television signal, can produce a high definition television signal representative of said images;
   generating a code signal representative of a second transmission frequency channel over which said second television signal is to be transmitted;
   combining said code signal into said first television signal;
   transmitting said first television signal over a first transmission frequency channel and said second television signal over said second transmission frequency channel;
   receiving said first television signal, and recovering said code signal from the received first television signal;
   controlling a tuner with said code signal to selectively receive said second television signal over said second transmission frequency channel represented by said code signal; and
   producing a high definition television signal representative of said images from a combination of the received first and second television signals.

2. The method as defined by claim 1, wherein said second transmission frequency channel is not adjacent to said first transmission frequency channel.

3. The method as defined by claim 2, further comprising the step of displaying the produced high definition television signal.

4. The method as defined by claim 2, wherein said receiving of said first television signal includes tuning another tuner to the transmission frequency channel of said first television signal.

5. The method as defined by claim 2, wherein said first television signal is a relatively low resolution television signal, and said second television signal contains detail signals for enhancing said first television signal.

6. The method as defined by claim 2, wherein said first television signal comprises an NTSC type of television signal, and said second television signal comprises a detail signal for enhancing said NTSC type signal to obtain a high definition television signal.

7. The method as defined by claim 1, further comprising the steps of generating a second code signal representative of a characteristic of the second television signal; combining said second code signal into said first television signal; recovering the second code signal from the received first television signal; and utilizing said recovered second code signal in obtaining said second television signal.

8. The method as defined by claim 2, further comprising the steps of generating a second code signal representative of a characteristic of the second television signal; combining said second code signal into said first television signal; recovering the second code signal from the received first television signal; and utilizing said recovered second code signal in obtaining said second television signal.

9. The method as defined by claim 5, further comprising the steps of generating a second code signal representative of a characteristic of the second television signal; combining said second code signal into said first television signal; recovering the second code signal from the received first television signal; and utilizing said recovered second code signal in obtaining said second television signal.

10. The method as defined by claim 9, wherein said second television signal occupies a portion of said second transmission frequency channel, and wherein said second code signal is utilized in determining the portion of the second transmission frequency channel that contains the second television signal.

11. A system for transmission and reception of high definition television signals, comprising:
   means for deriving, for images of a scene to be transmitted, a first television signal and a second television signal, said second television signal containing an enhancement signal which, when combined with said first television signal, can produce a high definition television signal representative of said images;
   means for generating a code signal representative of a second transmission frequency channel over which said second television signal is to be transmitted;
   means for combining said code signal into said first television signal;
   means for transmitting said first television signal over a first transmission frequency channel and for transmitting said second television signal over said second transmission frequency channel; and
   receiver means, including: a first tuner, for receiving said first television signal, means for recovering said code signal from the received first television signal; a second tuner which is electronically controllable; means for applying a signal derived from the recovered code signal to said second tuner to tune said second tuner to said second transmission frequency channel so as to receive said second television signal; and means for combining the received first and second television signals to obtain a high definition television signal representative of said images.

12. The system as defined by claim 11, wherein said transmitting means is operative to transmit said second television signal over a second transmission frequency channel that is not adjacent to said first transmission frequency channel.

13. The system as defined by claim 11, further comprising means for generating a second code signal representative of a characteristic of the second television signal; means for combining said second code signal into said first television signal; means in said receiver means for recovering said second code signal; and means in said receiver means for utilizing said second code signal in obtaining said second television signal.

14. The system as defined by claim 12, further comprising means for generating a second code signal representative of a characteristic of the second television signal; means for combining said second code signal into said first television signal; means in said receiver means for recovering said second code signal; and means in said receiver means for utilizing said second code signal in obtaining said second television signal.

15. For use in a system for transmitting and receiving high definition television signals representative of images of a scene, said system including a transmitter and a receiver, said transmitter including means for deriving first and second television signals representative of said images; means for generating a code signal representative of a transmission frequency channel over which said second television signal is to be transmitted; means for combining said code signal with said first television signal; and means for transmitting said first television signal over a first transmission frequency channel and for transmitting said second television signal over said second transmission frequency channel, said second transmission frequency channel being not adjacent to said first transmission frequency channel; a receiver which comprises:
  first and second tuning means, said first tuning means being controllable to obtain said first television signal transmitted over said first transmission frequency channel;
  means responsive to said first television signal for recovering said code signal from said first television signal;
  means for automatically controlling said second tuning means in accordance with the recovered code signal to tune said second tuning means to obtain said second television signal transmitted over said second transmission frequency channel; and
  means for producing a high definition television signal representative of said images by combining the received first and second television signals.

16. In the system as defined by claim 15, wherein said transmitter further comprises means for generating a second code signal representative of a characteristic of the second television signal, and means for combining said second code signal into said first television signal; said receiver further comprising:
  means for recovering said second code signal; and
  means for utilizing said second code signal in obtaining said second television signal.

17. For use in a system for transmitting and receiving high definition television signals representative of images of a scene, the system including a transmitter and a receiver, a transmitter for said system comprising:
  means for deriving first and second television signals representative of said images;
  means for generating a code signal representative of a transmission frequency channel over which said second television is to be transmitted;
  means for combining said code signal with said first television signal; and
  means for transmitting said first television signal over a first transmission frequency channel and for transmitting said second television signal over a second transmission frequency channel as is represented by said code signal, said second transmission frequency channel being not adjacent to said first transmission frequency channel;
  whereby when said first television signal is received at a receiver, said code signal can be recovered therefrom and utilized to automatically tune a tuner to receive said second television signal, said second television signal to be used for enhancing said first television signal to obtain a high definition television signal representative of said images.

18. In the system as defined by claim 17, wherein said second television signal, wherein said transmitter further comprises means for generating a second code signal representative of a characteristic of the second television signal to be applied to said second frequency transmission channel; and means for combining said second code signal into said first television signal.

* * * * *

UNITED STATES PATENT AND TRADEMARK OFFICE
CERTIFICATE OF CORRECTION

PATENT NO. : 4,800,426
DATED : January 24, 1989
INVENTOR(S) : William E. Glenn

It is certified that error appears in the above-identified patent and that said Letters Patent is hereby corrected as shown below:

In the title, after "DEFINITION" insert --TELEVISION--.

Signed and Sealed this

Twentieth Day of June, 1989

Attest:

DONALD J. QUIGG

Attesting Officer

Commissioner of Patents and Trademarks